(12) United States Patent
Cheatle (10) Patent No.: US 9,442,264 B1
(45) Date of Patent: Sep. 13, 2016

(54) TIGHT BUFFERED OPTICAL FIBERS AND OPTICAL FIBER CABLES

(71) Applicant: Superior Essex International LP, Atlanta, GA (US)

(72) Inventor: Wayne Patrick Cheatle, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 96 days.

(21) Appl. No.: 14/580,734

(22) Filed: Dec. 23, 2014

(51) Int. Cl.
G02B 6/44 (2006.01)

(52) U.S. Cl.
CPC .................... G02B 6/443 (2013.01)

(58) Field of Classification Search
CPC ........................................ G02B 6/443
See application file for complete search history.

(56) References Cited

U.S. PATENT DOCUMENTS

| | | |
|---|---|---|
| 4,037,922 A | 7/1977 | Claypoole |
| 4,072,400 A | 2/1978 | Claypoole et al. |
| 4,100,008 A | 7/1978 | Claypoole |
| 4,472,021 A | 9/1984 | Ansel et al. |
| 4,585,534 A | 4/1986 | Pasternack et al. |
| 4,623,700 A | 11/1986 | Traver et al. |
| 4,679,899 A | 7/1987 | Kobayashi et al. |
| 4,689,248 A | 8/1987 | Traver et al. |
| 4,749,055 A | 6/1988 | Momiyama |
| 4,848,869 A | 7/1989 | Urruti |
| 4,877,306 A | 10/1989 | Kar |
| 4,889,768 A | 12/1989 | Yokoshima et al. |
| 4,893,893 A | 1/1990 | Claxton et al. |
| 4,923,754 A | 5/1990 | Lee et al. |
| 4,935,455 A | 6/1990 | Huy et al. |
| 4,953,945 A | 9/1990 | Nishimura et al. |
| 5,011,260 A | 4/1991 | Marx et al. |
| 5,054,883 A | 10/1991 | Eckberg |
| 5,139,816 A | 8/1992 | Eckberg |
| 5,181,268 A | 1/1993 | Chien |
| 5,268,984 A | 12/1993 | Hosoya et al. |
| 5,408,564 A | 4/1995 | Mills |
| 5,621,838 A | 4/1997 | Nomura et al. |
| 5,684,910 A | 11/1997 | Chapin et al. |
| 5,838,862 A | 11/1998 | Chien |
| 5,908,873 A | 6/1999 | Shustack |
| 5,949,940 A | 9/1999 | Botelho et al. |
| 6,298,189 B1 | 10/2001 | Szum et al. |
| 6,326,416 B1 | 12/2001 | Chien et al. |
| 6,339,666 B2 | 1/2002 | Szum et al. |
| 6,455,607 B1 | 9/2002 | Shustack |
| 6,538,045 B1 | 3/2003 | Murphy et al. |
| 6,559,197 B2 | 5/2003 | Fewkes et al. |
| 6,584,263 B2 | 6/2003 | Fewkes et al. |
| 6,661,959 B2 | 12/2003 | Szum et al. |
| 6,714,712 B2 | 3/2004 | Bishop et al. |
| 6,714,713 B2 | 3/2004 | Lanier et al. |
| 6,768,853 B2 | 7/2004 | Neveux, Jr. |
| 6,775,443 B2 | 8/2004 | Bringuier et al. |
| 6,797,740 B2 | 9/2004 | Abel et al. |
| 6,850,681 B2 | 2/2005 | Lepont et al. |

(Continued)

Primary Examiner — Daniel Petkovsek (57) ABSTRACT

Tight buffered optical fibers and cables containing tight buffered optical fibers are described. A tight buffered optical fiber may include an optical fiber, which may include a core and cladding. At least one protective layer may be formed around the optical fiber, and at least one buffer layer may be formed around the at least one protective layer. The buffer layer may include a thermoplastic polymer blended or mixed with a siloxane slip agent that permits the buffer layer to be stripped from the underlying optical fiber.

20 Claims, 4 Drawing Sheets

(56) References Cited

U.S. PATENT DOCUMENTS

| | | |
|---|---|---|
| 6,876,807 B2 | 4/2005 | Lanier et al. |
| 6,957,000 B2 | 10/2005 | McAlpine et al. |
| 6,993,226 B2 | 1/2006 | Castellani et al. |
| 7,041,712 B2 | 5/2006 | Murphy et al. |
| 7,088,897 B2 | 8/2006 | Kim et al. |
| 7,142,752 B2 | 11/2006 | Chiasson et al. |
| 7,155,100 B2 | 12/2006 | Murphy et al. |
| 7,214,431 B2 | 5/2007 | Komiya et al. |
| 7,221,841 B2 | 5/2007 | Chase et al. |
| 7,295,737 B2 | 11/2007 | Moorjani et al. |
| 7,346,244 B2 * | 3/2008 | Gowan ............... G02B 6/4434 385/100 |
| 7,493,000 B2 | 2/2009 | Yamaguchi et al. |
| 7,660,505 B2 | 2/2010 | Chase et al. |
| 7,676,130 B2 | 3/2010 | Chien et al. |
| 7,742,668 B2 | 6/2010 | Nothofer et al. |
| 8,358,894 B2 | 1/2013 | Martin-Regalado et al. |
| 8,374,473 B2 * | 2/2013 | Weimann ............ C03C 25/1065 385/128 |
| 8,442,371 B2 | 5/2013 | Oyama et al. |
| 8,494,326 B2 | 7/2013 | Consonni et al. |
| 8,571,369 B2 | 10/2013 | Tatat |
| 8,750,665 B2 | 6/2014 | Testu et al. |
| 2002/0037146 A1 * | 3/2002 | Szum ................... C03C 25/1065 385/128 |
| 2002/0197040 A1 | 12/2002 | Takahashi et al. |
| 2005/0135763 A1 | 6/2005 | Drenzek et al. |
| 2005/0244113 A1 * | 11/2005 | Chiasson ............. G02B 6/4402 385/100 |
| 2007/0246687 A1 | 10/2007 | Yamaguchi et al. |
| 2008/0045623 A1 | 2/2008 | Yamaguchi et al. |
| 2008/0125546 A1 | 5/2008 | Yamaguchi et al. |
| 2008/0194736 A1 * | 8/2008 | Lu .......................... B82Y 30/00 524/35 |
| 2008/0226913 A1 * | 9/2008 | Cattron ............... C03C 25/1065 428/392 |
| 2009/0171011 A1 | 7/2009 | Szum et al. |
| 2011/0026889 A1 | 2/2011 | Risch et al. |
| 2012/0031642 A1 * | 2/2012 | Chambers .......... B29C 47/0016 174/110 N |
| 2013/0108230 A1 | 5/2013 | Nave |
| 2015/0299605 A1 * | 10/2015 | Tomsheck ............... C08L 67/00 385/100 |
| 2016/0060476 A1 * | 3/2016 | Chen ..................... H01B 3/441 174/110 SR |

* cited by examiner

TIGHT BUFFERED OPTICAL FIBERS AND OPTICAL FIBER CABLES

TECHNICAL FIELD

Embodiments of the disclosure relate generally to tight buffered optical fibers and, more particularly, to tight buffered optical fibers and associated cables having a strippable buffer layer.

BACKGROUND

Optical fiber cables are utilized in a wide variety of applications. In many instances, the cables include tight buffered optical fibers. A tight buffered optical fiber typically includes an optical waveguide fiber, one or more protective coatings (e.g., a primary coating, a secondary coating, etc.) surrounding an outer surface of the fiber, and a buffer layer formed to surround the optical fiber and its protective coating(s). The buffer layer is formed in intimate contact with the protective coating(s), requiring the buffer layer to be stripped in order to access the optical fiber. For example, during installation or patching of an optical fiber cable, a technician is often required to strip a buffer layer from an optical fiber in order to terminate the optical fiber.

Conventional tight buffers are often difficult to strip or remove from an underlying optical fiber at lengths longer than an inch or two without damaging the protective coating(s) or breaking the fibers. As a result, the stripping of conventional buffer tubes often requires multiple passes of stripping small segments of a tight buffer layer until a desired strip length is reached. This process is time consuming and inconvenient. Accordingly, there is an opportunity for improved tight buffer designs that are relatively easy to strip from optical fibers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to tight buffered optical fibers and cables including tight buffered optical fibers. An optical fiber, such as an optical fiber including a core, a cladding, and one or more protective coatings, may be surrounded by a tight buffer layer along a longitudinal direction of the fiber. Additionally, according to an aspect of the disclosure, the tight buffer layer may be easier to strip from the optical fiber relative to conventional tight buffers. For example, in certain embodiments, the tight buffer layer may be stripped from the optical fiber with a force of approximately 20 Newtons or less per 25 millimeters of tight buffer removed.

As desired in various embodiments, a tight buffer layer may be formed from any number of suitable materials. For example, a tight buffer layer may be formed from a suitable thermoplastic polymer (or combination of polymers), such as polyvinyl chloride ("PVC"). Additionally, one or more slip agents or slip additives may be combined with or added to the base tight buffer material (e.g., one or more thermoplastic polymers). In certain embodiments, one or more slip agents having a relatively high molecular weight may be added to the base tight buffer material. As one example embodiment, a siloxane slip agent may be mixed or blended with the base tight buffer material. The resulting mixture or compound may then be utilized to form a tight buffer on an optical fiber. The addition of the siloxane slip agent to the tight buffer results in easier stripping of the tight buffer from the optical fiber.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
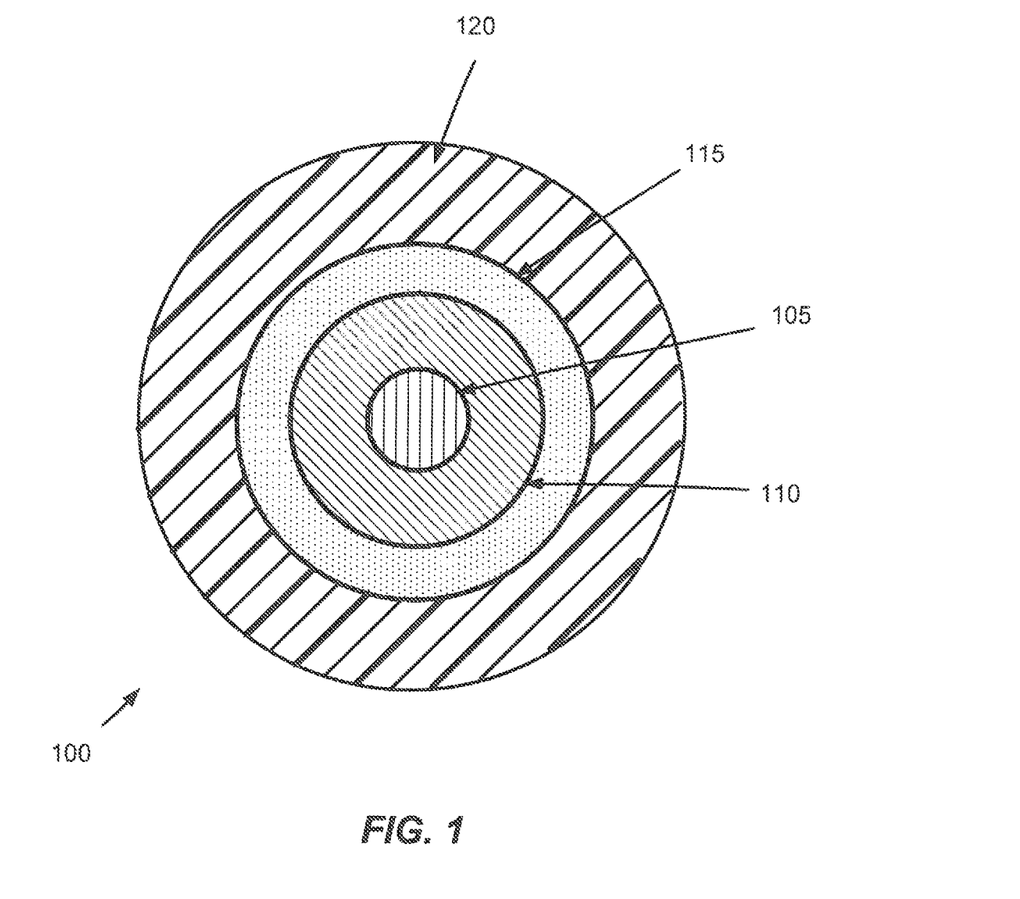
FIG. 1 is a cross-sectional view of a tight buffered optical fiber, according to an illustrative embodiment of the disclosure.

With reference to FIG. 1, a cross-sectional view of an example tight buffered optical fiber 100 is illustrated. The tight buffered optical fiber 100 may include at least one optical fiber with a core 105 and a cladding 110. In certain embodiments, one or more protective coatings 115 or protective layers may be formed on the cladding 110. A tight buffer layer 120 may then be formed on the protective coating(s) 115 or, in embodiments with no protective coating formed on the cladding, directly on the cladding. As desired, the combination of the core 105 and the cladding 110 may be referred to as an optical fiber or an optical wave guide. Additionally or alternatively, the tight buffered optical fiber, including the optical wave guide, one or more optional protective coatings, and a buffer layer, may be generally referred to as an optical fiber.

As illustrated in FIG. 1, in certain embodiments, the optical fiber may include a single core 105. In other embodiments, the optical fiber may include multiple cores. The core 105 may be configured to propagate light at one or more desirable wavelengths (e.g., 1310 nm, 1550 nm, etc.) and/or at any desired transmission rate or data rate, such as a transmission rate between approximately 10 Giga bits per second ("Gbps") and approximately 40 Gbps. The cladding 110 may have a lower index of refraction than that of the core 105, to facilitate propagation of a signal through the core 105. The core 105 and the cladding 110 may include any suitable compositions and may be formed from a wide variety of suitable materials, such as glass, glassy substance(s), one or more silica materials, one or more plastic materials, or a suitable combination of materials.

A wide variety of different types of optical fibers may be utilized as desired in various embodiments. For example, an optical fiber may be a single mode fiber, multi-mode fiber, or some other suitable optical waveguide that carries data. The optical fiber may also have any suitable cross-sectional diameter or thickness. For example, a single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, one or more protective coatings 115 may be formed on or around the cladding 110. The protective coating(s) 115 may protect the optical fiber from physical, mechanical, and/or environmental damage. For example, the protective coating(s) 115 may protect against mechanical stresses, scratches, and/or moisture damage. In the event that multiple protective coatings are utilized, the coatings may be applied in concentric layers. In certain embodiments, a dual-layer protective coating approach may be utilized. An inner primary coating may be formed around the cladding 110, and an outer secondary coating may be formed around the inner coating. The outer secondary coating may be harder than the inner primary coating. In this regard, the inner primary coating may function as a shock absorber to minimize attenuation caused by microbending, and the outer secondary coating may protect against mechanical damage and act as a barrier to lateral forces.

Other configurations of protective coating(s) 115 may be utilized as desired in various embodiments. Additionally, the protective coating(s) 115 may be formed from a wide variety of suitable materials and/or combinations of materials. A few example materials include, but are not limited to acrylates, acrylate resins, ultraviolet ("UV")-cured materials, urethane acrylate composite materials, etc.

A buffer layer 120 may be formed around the optical fiber and, if present, the protective coating(s). According to an aspect of the disclosure, the buffer layer 120 may be formed in intimate contact with an underlying layer along a longitudinal length of the optical fiber. In other words, the buffer layer 120 may encapsulate the underlying optical fiber and protective coating(s) at any given cross-section of the optical fiber taken along a longitudinal direction. The formation of a buffer layer 120 in intimate contact with an underlying layer (i.e., approximately no spacing between the buffer layer 120 and an underlying layer) may be referred to as a tight buffered configuration. Thus, the combination of the optical fiber and the buffer layer 120 may be referred to as a tight buffered optical fiber.

Additionally, the buffer layer 120 may be formed directly on an outer protective coating or, if no protective coatings are utilized, directly on the optical fiber. In other words, no intermediate layers are positioned between the buffer layer 120 and an outer protective coating (or cladding if no protective coatings are utilized). Certain conventional tight buffer designs incorporate a release layer between an optical fiber (or coated optical fiber) and a tight buffer layer. As a result of forming the buffer layer 120 directly on the optical fiber or outer protective coating, no release layer will be present.

A wide variety of suitable materials and/or combinations of materials may be utilized to form the buffer layer 120. In certain embodiments, the buffer layer 120 may be formed as a combination, mixture, or blend of a base material and one or more slip agents or release agents that facilitates stripping of the buffer layer 120 from the underlying optical fiber. As desired in various embodiments, the base material may include any suitable buffer materials and/or combinations of materials. For example, the base material may include one or more suitable polymeric materials, such as a thermoplastic polymer. In one example embodiment, the base material may include polyvinyl chloride ("PVC"). Other suitable polymeric materials, such as polyethylene ("PE"), polypropylene ("PP"), and/or polybutylene terephthalate ("PBT"), may be utilized as desired in various embodiments.

According to an aspect of the disclosure, one or more slip agents or release agents may be mixed, blended, or combined with the base material to result in a buffer layer material that may be more easily stripped from an optical fiber relative to conventional buffer materials. In certain embodiments, a slip agent may provide lubrication to the base material and/or to the buffer layer 120 to facilitate easier stripping or removal of the buffer layer 120. A wide variety of different slip agents may be utilized as desired in various embodiments. In certain embodiments, a siloxane material or a siloxane-containing material may be utilized as a slip agent. A siloxane material may include one or more functional groups having a Si—O—Si linkage. In certain embodiments, a slip agent may include one or more materials that contain siloxane polymers.

As desired, a slip agent may be incorporated into a composite material that may be combined with a base buffer material (e.g., PVC, etc.). For example, siloxane polymers may be dispersed within one or more additional materials. In one example embodiment, a composite material may include siloxane polymers dispersed within ethylene vinyl acetate ("EVA"). One example material that may be utilized as a composite material containing a siloxane slip agent is a Siloxane Masterbatch MB50-320 material, which is manufactured by Dow Corning Corporation. In other embodiments, siloxane polymers (or other slip agent polymers) may be dispersed in other suitable carrier materials, such as suitable elastomeric materials, thermoplastic materials, etc. Other suitable composite materials may be utilized as desired in other embodiments. For example, siloxane particles may be dispersed within a thermoplastic elastomer ("TPE") or thermoplastic rubber material (e.g., a styrenic block copolymer, a polyolefin TPE, an elastomeric alloy, a thermoplastic polyurethane, a thermoplastic copolyester, a thermoplastic polyamide, etc.), a polyolefine material or blend of materials, ethyl acetoacetate ("EAA"), and/or any other suitable material or combination of materials.

In the event that a composite material incorporating a slip agent is utilized, the various components of the composite material may have a wide variety of suitable mixing ratios. For example, with the a Siloxane Materbatch MB50-320 material, the siloxane slip agent and the EVA may have approximately a 1:1 ratio. In other words, each component may constitute approximately 50% by weight of the overall material. Other suitable mixing or blending ratios may be utilized as desired.

In certain embodiments, a slip agent or release agent may have a relatively high molecular weight, such as a molecular weight as high as approximately 2,500,000. In other embodiments, a slip agent may have a molecular weight between approximately 30,000 and approximately 200,000. In certain embodiments, a slip agent may have a molecular weight of at least approximately 600,000 or a molecular weight between approximately 200,000 and approximately 1,000,000. Additionally, in certain embodiments, a composite material that incorporates a slip agent may have any suitable molecular weight. As a result of having a relatively high molecular weight, it may be more difficult for the slip agent to migrate within a buffer layer and/or the other material components of the buffer layer. For example, it may be unlikely that the slip agent will bloom to the surface of the buffer layer or leech out of the buffer layer.

Although siloxane is described as an example slip agent herein, other suitable materials may be utilized in other embodiments of the disclosure. For example, other suitable silicon-containing substances or materials may be utilized as a slip agent or release agent. For example, an alkylated silicone substance, a non-reactive alkylated silicone substance, or a cross-linked non-reactive alkylated silicone substance may be utilized. One example of an alkylated silicone slip agent is cross-linked non-reactive alkyl polydimethylsiloxane ("PDMS") or alkyl dimethicone, such as Silwax® CR-5016, which is produced and sold by Siltech LLC. Other suitable polymeric organosilicon materials may be utilized in other embodiments.

A wide variety of suitable methods and/or techniques may be utilized to mix or blend one or more slip agents with one or more base materials (e.g., PVC, etc.). In certain embodiments, one or more slip agents or one or more composite materials incorporating slip agent(s) may be physically mixed or blended with the base material(s). For example, one or more slip agents (or composite materials) may be provided in a solid state and mixed or blended with the base material(s). In certain embodiments, a slip agent material may be provided in a Masterbatch form, such as in a pelletized form. For example, a siloxane material or a composite material containing siloxane may be provided in pelletized form, and the pellets may be mixed or blended with corresponding pellets of the base material. The mixture may then be provided to one or more suitable extrusion devices configured to apply a buffer layer 120 onto an optical fiber. In certain extrusion processes, the various components materials of the mixture (e.g., the base materials and the slip agent(s)) may be melted or otherwise converted into a molten or liquid state. Accordingly, the extrusion process may result in additional mixing or blending of the component materials. In certain embodiments, the extrusion process may result in compounding and/or chemical bonding of various component materials.

In other embodiments, one or more slip agents may be blended with one or more base materials in a liquid form. For example, pellets of thermoplastic material may be melted into a liquid form. A liquid slip agent may then be compounded, blended, or mixed with the thermoplastic material. In certain embodiments, the resulting mixture or compound may then be formed into pellets by a compounding extruder, and the pellets may be provided to a suitable extrusion device configured to apply a buffer layer 120 onto an optical fiber.

A wide variety of different mix rates or blend rates of a base material (or combination of base materials) and a slip agent (or combination of slip agents) may be utilized as desired in various embodiments. In certain embodiments, if a slip agent is incorporated into a composite material, then an amount of composite material blended or mixed with a base material may be selected such that a desired amount or percentage of slip agent (e.g., a percentage of slip agent relative to the total amount of material within the mixture) is achieved. In certain embodiments, a mixture or compound of a slip agent and a base material (and/or other component materials) may include between approximately 0.01% and approximately 5.0% of slip agent by weight. In other embodiments, a mixture or compound may include between approximately 0.05% and approximately 3.0% of slip agent by volume. For example, a mixture of base material and slip agent may include approximately 1.0% of a slip agent by volume. In yet other embodiments, a mixture or compound may include approximately 0.5%, 1.0%, 1.5%, 2.0%, 2.5%, 3.0%, 3.5%, 4.0%, 4.5%, or 5.0%/o of release agent by volume. In other embodiments, a mixture or compound may include any suitable percentage of release agent included in a range between any two of the above listed values.

Once one or more base materials and one or more release agents have been mixed, blended, compounded, or otherwise combined, the resulting mixture may be utilized to form a tight buffer layer 120 on an optical fiber. A wide variety of suitable methods and/or techniques may be utilized as desired to form a tight buffer layer 120. In certain embodiments, a tight buffer layer 120 may be extruded onto an optical fiber via one or more suitable extrusion devices, such as one or more suitable extrusion heads. In one example embodiment, either prior to or during the formation of a cable, an optical fiber may be fed from a suitable source (e.g., a bin, a reel, a box, etc.), and the optical fiber may be fed in relatively close proximity to one or more extrusion devices. The extrusion devices may extrude tight buffer material onto the optical fiber and, as desired, the optical fiber may be passed through one or more dies in order to control an outer diameter of the extruded tight buffer 120.

An inner diameter of the tight buffer layer 120 may be approximately equal to an outer diameter of the optical fiber or outermost protective coating. Additionally, the tight buffer layer 120 may be formed with any suitable outer diameter. For example, in certain embodiments, the tight buffer layer 120 may be extruded or otherwise formed to have an outer diameter of approximately 900 microns or micrometers. In other embodiments, the tight buffer layer 120 may be formed to have an outer diameter between approximately 500 microns and approximately 900 microns. In yet other embodiments, the tight buffer layer 120 may be formed to have an outer diameter between approximately 400 microns and approximately 900 microns. Other suitable outer diameters may be utilized as desired.

Because a wide variety of suitable outer diameters may be utilized for the tight buffer layer 120, the tight buffer layer 120 may be formed with a wide variety of suitable thicknesses as desired in various embodiments. In certain example embodiments, the tight buffer layer 120 may have a thickness between approximately 50 microns or micrometers and approximately 875 microns. For example, the tight buffer layer 120 may have a thickness of at least approximately 325 microns.

As a result of incorporating a slip agent, such as a siloxane slip agent, into a buffer layer, it may be relatively easier to strip the buffer layer 120 from an optical fiber. In certain embodiments, the slip agent may provide lubrication to the buffer layer 120, thereby allowing the buffer layer 120 to more easily be stripped from the optical fiber. In certain embodiments, the tight buffer layer 120 may be stripped from the optical fiber with a force of approximately 20 Newtons ("N") per 25 mm of intact tight buffer. Additionally, in certain embodiments, approximately 100 mm of buffer layer 120 may be stripped from the optical fiber with a force of approximately 15 N or less.

The buffer layer 120 described with reference to FIG. 1 may be utilized in conjunction with a wide variety of different optical fibers. These optical fibers may include more or less than the components described for the optical fiber 100 of FIG. 1. The optical fiber 100 of FIG. 1 is provided by way of example only. Additionally, buffer layers having a construction similar to the buffer layer 120 of FIG. 1 may be utilized in association with optical fiber ribbons and/or optical fiber ribbon cables. In other words, a buffer material including an alkylated silicone release agent may be utilized as a ribbon material.

Figure 2:
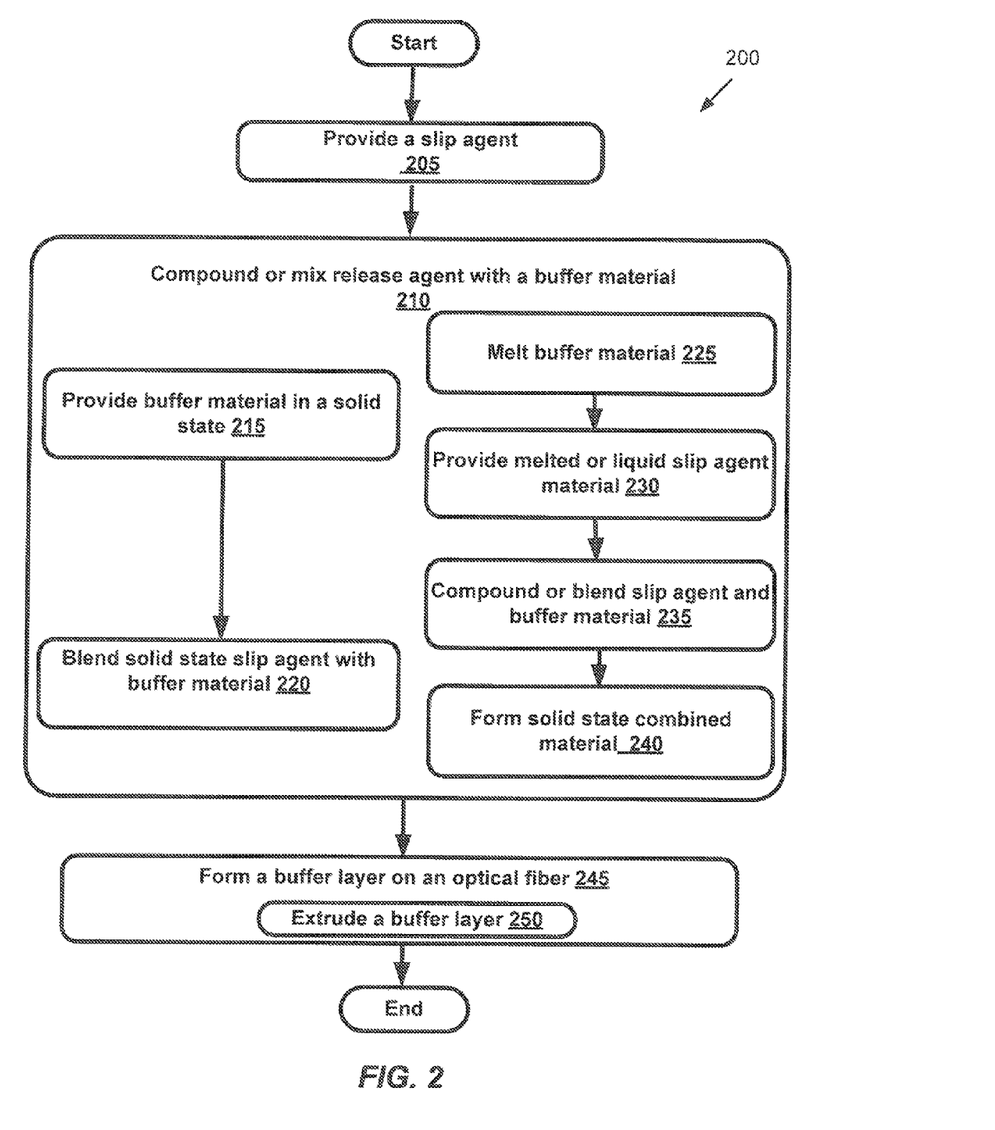
FIG. 2 is a flow chart illustrating an example method for forming a tight buffered optical fiber, according to an illustrative embodiment of the disclosure.

A wide variety of suitable methods and/or techniques may be utilized to form a tight buffered optical fiber with a strippable buffer layer. FIG. 2 is a flow chart illustrating one example method 200 for forming a tight buffered optical fiber, such as the tight buffered optical fiber 100 illustrated in FIG. 1. The method 200 may begin at block 205. At block 205, a slip agent may be formulated or otherwise provided. As set forth in greater detail above with reference to FIG. 1, a wide variety of suitable slip agents may be provided. For example, a siloxane slip agent or a material containing a siloxane slip agent may be provided.

At block 210, the slip agent may be mixed, blended, or otherwise combined with one or more suitable buffer materials or base buffer materials. For example, the slip agent may be blended with one or more suitable thermoplastic materials utilized to form an optical fiber buffer layer, such as PVC. A wide variety of suitable methods and/or techniques may be utilized to combine the slip agent with a buffer material. For example, at block 215, buffer material may be provided in a solid state or form. In one example embodiment, buffer material may be provided in pelletized form. At block 220, a slip agent, such as a pelletized or other solid state slip agent (which may be incorporated into a compound material), may be physically blended or mixed with the buffer material. The resulting mixture may subsequently be provided to one or more extrusion devices in order to form a buffer layer.

As another example of mixing a slip agent and buffer material(s), at block 225, a buffer material may be melted or otherwise converted into liquid form. A slip agent may also be provided in liquid form at block 230. For example, the slip agent may be purchased or formulated in liquid form. As another example, a solid state slip agent may be melted. At block 235, the slip agent and the buffer material may be compounded or blended together and, in some cases, the compounded may result in chemical bonding of the slip agent and buffer material. As desired in certain embodiments, solid compounded or combined buffer material may then be formed at block 235. For example, the slip agent and buffer material may be mixed in a compounding extruder, and pellets of compounded buffer material may be formed by the compounding extruder.

Regardless of the method(s) utilized to mix or blend a slip agent and buffer material, the resulting mixture or combination may be utilized to form a buffer layer on at least one optical fiber. For example, a tight buffer layer may be formed on an optical fiber at block 245. A wide variety of suitable methods and/or techniques may be utilized to form a buffer layer on an optical fiber. For example, at block 250, one or more suitable extrusion devices may be utilized to form a buffer layer. In one example embodiment, a pelletized mixture of material (e.g., a physical mixture of buffer material and slip agent-containing material, pellets formed after compounding buffer material and a slip agent, etc.) may be provided to one or more extrusion devices, and the pellets may be melted during the extrusion of a buffer layer. The method 200 may end following block 250.

The operations described and shown in the method 200 of FIG. 2 may be carried out or performed in any suitable order as desired in various embodiments. Additionally, in certain embodiments, at least a portion of the operations may be carried out in parallel. Furthermore, in certain embodiments, less than or more than the operations described in FIG. 2 may be performed.

A wide variety of different types of cables may be constructed utilizing one or more tight buffered optical fibers, such as the optical fibers discussed herein. These cables may include, for example, optical fiber cables, telecommunications cables, and/or a wide variety of composite cables (e.g., cables including a combination of optical fiber(s) and other transmission media). Additionally, embodiments of the disclosure may be utilized in association with drop cables, horizontal cables, vertical cables, flexible cables, plenum cables, riser cables, or any other appropriate cables.

Figure 3:
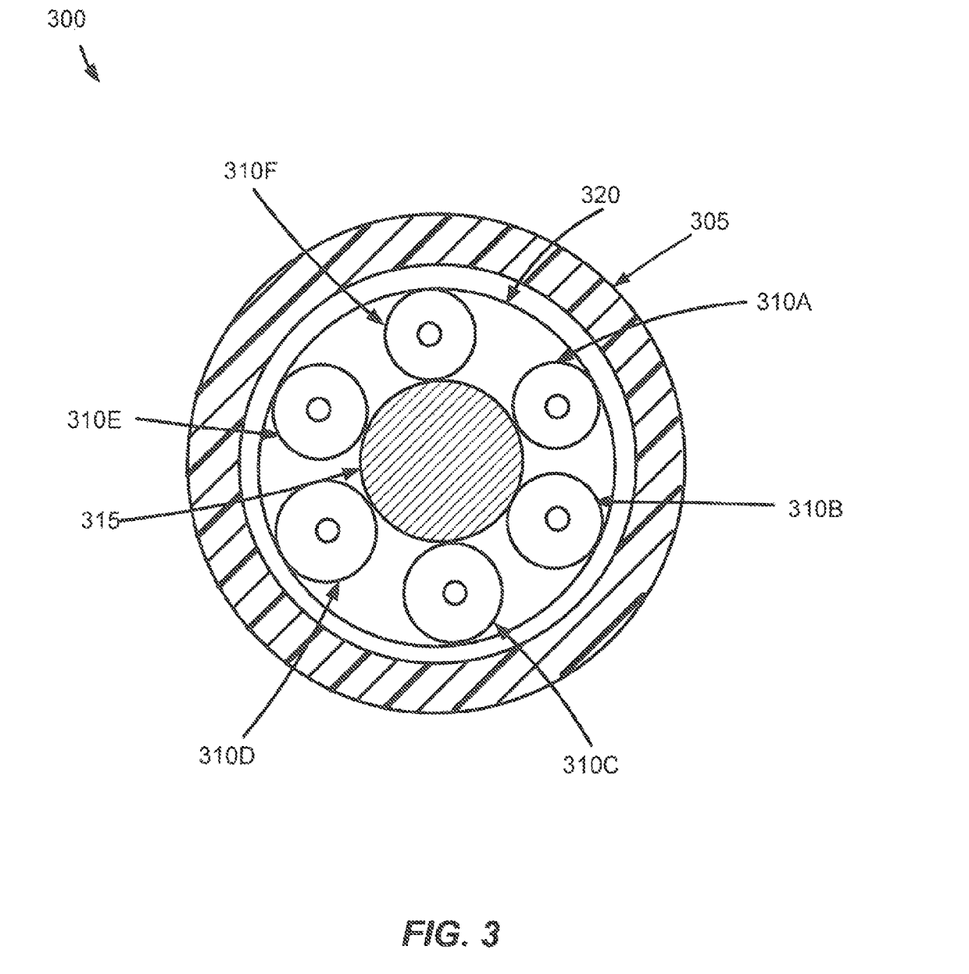
FIGS. 3-4 illustrate example cable constructions that may incorporate tight buffered optical fibers, according to illustrative embodiments of the disclosure.

FIG. 3 illustrates one example cable 300 that may incorporate tight buffered optical fibers, according to illustrative embodiments of the disclosure. The cable 300 may include an outer jacket 305, and at least one optical fiber 310A-F may be situated or positioned within the outer jacket 305. As shown in FIG. 3, each of the optical fibers 310A-F (generally referred to as optical fiber 310) may be a tight buffered optical fiber similar to the optical fiber 100 described above with reference to FIG. 1. In other embodiments, one or more optical fibers may be positioned within buffer tubes or other fiber sheaths and/or subunits.

The outer jacket 305 may enclose the internal components of the cable 300, seal the cable 300 from the environment, and provide strength and structural support. The jacket 305 may include any number of layers (e.g., a single layer, multiple layers, etc.) and may be formed from a wide variety of suitable materials, such as one or more polymeric materials, polyvinyl chloride ("PVC"), polyurethane, a fluoropolymer, polyethylene, neoprene, cholorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 305 can include flame retardant and/or smoke suppressant materials. Additionally, the jacket 305 may include a wide variety of suitable shapes and/or dimensions. For example, as shown in FIG. 3, the jacket 305 may be formed to result in a round cable or a cable having an approximately circular cross-section. In other embodiments, the jacket 305 may be formed to result in other desired shapes, such as an elliptical shape (e.g., a cable having an approximately oval cross-section) or a rectangular shape. The jacket 305 may also have a wide variety of dimensions, such as any suitable or desirable outer diameter and/or any suitable or desirable wall thickness. In various embodiments, the jacket 305 can be characterized as an outer jacket, an outer sheath, a casing, a circumferential cover, or a shell.

The jacket 305 may enclose one or more openings in which other components of the cable 300 are disposed. At least one opening enclosed by the jacket 305 may be referred to as a cable core, and transmission media may be disposed in the cable core. In the cable 300 illustrated in FIG. 1, a plurality of tight buffered optical fibers 310A-F may be disposed in the cable core. In certain embodiments, the jacket 305 may be extruded or poltruded over the optical fibers 310A-F during construction of the cable 300. For example, the optical fibers 310A-F may be stranded or otherwise cabled together, and the jacket 305 may be formed over the stranded optical fibers 310A-F.

In certain embodiments, one or more strength members may be incorporated into the cable 300. For example, one or more strength members, such as central strength member 315, may be disposed or positioned within a cable core. As desired, the tight buffered optical fibers 310A-F (and/or other cable components situated within the cable core) may be stranded around the central strength member 315. For example, the optical fibers 310A-F may be helically twisted or S—Z stranded about the central strength member 315. In other embodiments, one or more strength members may be embedded in the cable jacket 305. For example, strength rods may be embedded in the cable jacket 305 on opposite sides of a cable core. In another example embodiment, the cable 300 can be formed with a "figure-8" design that is suitable for aerial deployment, for example, spanning between poles. In such a design, a strength member can be positioned within one loop of the figure-8 and a cable core containing one or more transmission media may be positioned within the other loop. Indeed, a wide variety of different cable constructions may incorporate one or more tight buffered optical fibers and one or more strength members at various positions.

Strength members, such as the central strength member 315, may be formed from a wide variety of suitable materials. For example, strength members may be formed from metal wires (e.g., steel wire, etc.), metal rods, plastic rods, fiber-reinforced plastic ("FRP") rods, glass-reinforced plastic ("GRP") rods, fiberglass, or any other suitable material or combination of materials. As desired, a strength member may be formed from a plurality or combination of materials. For example, a strength member may be formed as a central rod (e.g., an FRP rod, etc.) that is coated with one or more additional layers, such as an elastomeric layer (e.g., silicone rubber, etc.) that provides compression cushioning and/or a friction inducing coating that promotes physical bonding and/or thermal coupling between the strength member and the tight buffered optical fibers 310A-F. Additionally, a strength member may have any desired diameter and/or other dimensions as desired in various embodiments. For example, a strength member may be sized based upon a number of optical fibers 310A-F and/or other cable components that are stranded with the strength member.

As desired, any number of suitable transmission media may be incorporated into a cable 300 and enclosed by the cable jacket 305. As shown in FIG. 3, one or more tight buffered optical fibers 310A-F may be situated within the jacket 305. Each of the optical fibers 310 may be similar to the optical fiber 100 described above with reference to FIG. 1. In other embodiments, twisted pair conductors, power conductors, buffer tubes containing one or more optical fibers and/or optical fiber ribbons, and/or other transmission media may be situated within a cable core. For example, a bundle of twisted pairs may be substituted for one of the tight buffered optical fibers 310 illustrated in the cable 300. As desired, other transmission media may be situated within a suitable sheath, shield layer, or other protective layer. For example, twisted pairs may be individually shielded or a shield may be formed around a group of twisted pairs. Indeed, a wide variety of cable configurations may be utilized as desired in various embodiments of the disclosure.

As desired in various embodiments, water swellable material may be incorporated into the cable 300. For example, water blocking gels, water blocking fibers, water blocking tapes, and/or water blocking yarns may be incorporated into the cable 300. As shown in FIG. 3, in certain embodiments, a water blocking tape 320 may be positioned within the cable core between the optical fibers 310A-F and the outer jacket 305. In certain embodiments, the cable 300 may be formed as a dry cable. The term "dry," as used herein in the context of characterizing a fiber optic cable or a fiber subunit (e.g., a buffer tube, etc.) within a cable, generally indicates that the cable does not contain any fluids, greases, or gels for blocking water incursion. As a result, it may be easier for a technician to install the cable as the technician will not be required to wipe off a grease or gel when the internal contents of the fiber subunit are accessed. In other embodiments, a water blocking gel or other fluid may be incorporated into the cable.

As desired in various embodiments, a wide variety of other materials may be incorporated into the cable 300. For example, the cable 300 may include an armor layer (e.g., a metal armor layer, a corrugated armor layer, etc.) and/or a location element. An example location element may include a metallic wire (e.g., a copper wire) or strip embedded into or attached to the jacket 305 that permits the cable to be located, for example, when buried. Additionally, as desired, the cable 300 may include a wide variety of strength members, insulating materials, dielectric materials, flame retardants, flame suppressants or extinguishants, and/or other materials.

Figure 4:
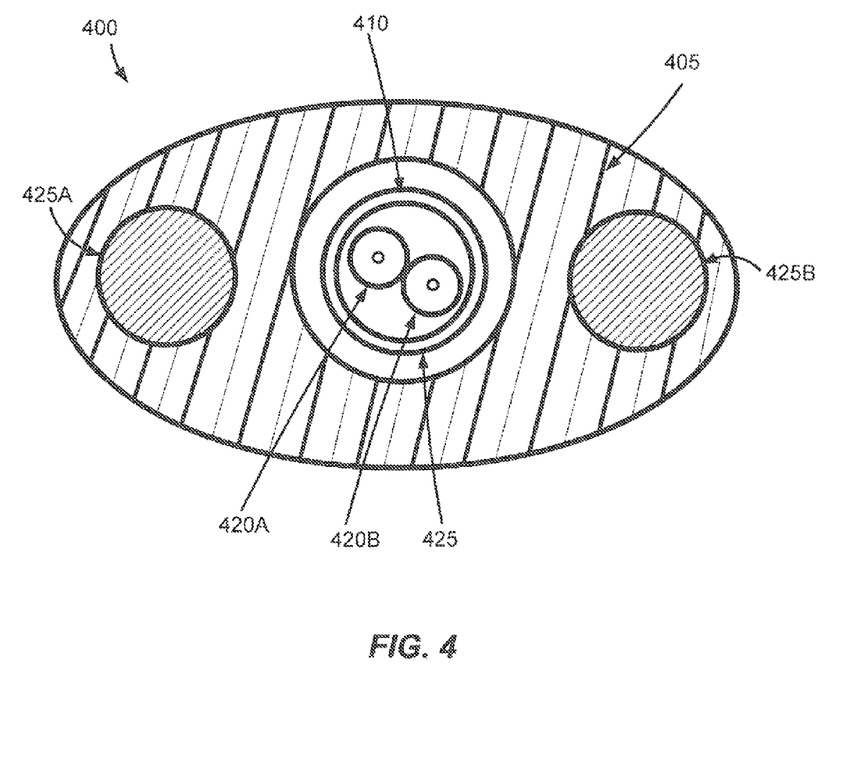

FIG. 4 illustrates another example cable 400 that may incorporate tight buffered optical fibers, according to illustrative embodiments of the disclosure. The cable 400 is illustrated as a fiber optic drop cable. However, as mentioned above, a wide variety of other types of cables may incorporate tight buffered optical fibers including a strippable buffer layer. With reference to FIG. 4, the cable 400 may include an outer jacket 405, and at least one optical fiber subunit 410 may be situated or positioned within the outer jacket 405, for example, within an opening or core formed in the outer jacket 405. Each optical fiber subunit 410 may include a suitable sheath layer 415 (or sheath), and one or more tight buffered optical fibers 420A, 420B may be positioned within the sheath 415. In certain embodiments, a ripcord may also be positioned within the sheath 415. In other embodiments, tight buffered optical fibers may be positioned within a core of the outer jacket 405 without being incorporated into a fiber subunit or enclosed by a sheath layer.

Similar to the cable 300 of FIG. 3, the jacket 405 may enclose the internal components of the cable 400, seal the cable 400 from the environment, and provide strength and structural support. The jacket 405, which may include any number of layers (e.g., a single layer, dual layers, etc.) may be formed from a wide variety of suitable materials and/or may include a wide variety of suitable shapes and/or dimensions. As shown in FIG. 4, the jacket 405 may be formed to result in an elliptical cable or a cable having an approximately oval cross-section; however, the jacket 405 and internal components may be formed to result in other desired shapes, such as a round or a rectangular shape.

The jacket 405 may enclose one or more openings in which other components of the cable 400 are disposed. At least one opening enclosed by the jacket 405 may be referred to as a cable core, and transmission media may be disposed in the cable core. In the cable 400 illustrated in FIG. 4, a fiber optic subunit 410 may be disposed in the cable core. In certain embodiments, the jacket 405 may be extruded or poltruded over the fiber optic subunit 410 during construction of the cable 400. As a result, the cable core may be defined by the size of the fiber optic subunit 410 during cable construction. In other embodiments, the jacket 405 may be extruded or formed over one or more removable elements (e.g., rods, etc.) in order to define at least one cable core into which a fiber optic subunit 410 can be inserted or positioned. Alternatively, at least one opening may be bored or otherwise formed from a jacket 405, and a fiber optic subunit 410 can be inserted or positioned within the at least one opening.

As desired, any number of suitable transmission media may be incorporated into a cable 400 and enclosed by the cable jacket 405. In certain embodiments, the cable 400 may be formed as a fiber optic cable, and one or more optical fibers may be enclosed by the cable jacket 405. According to an aspect of the disclosure, at least one of the optical fibers may be a tight buffered optical fiber similar to the optical fiber 100 illustrated and described above with reference to FIG. 1. As desired in certain embodiments, the optical fibers may be incorporated into one or more fiber optic subunits, such as subunit 410, or alternatively, one or more fibers may be positioned in a core without being incorporated into a subunit. In other embodiments, the cable 400 may be formed as a composite cable that includes both optical fibers and one or more other types of transmission media, such as one or more twisted pairs of conductors, one or more electrical power conductors, and/or one or more coaxial cables.

In certain embodiments, one or more strength members may be incorporated into the cable 400. For example, one or more strength rods may be embedded in the cable jacket 405. As shown in FIG. 4, strength rods 425A, 425B may be embedded in the cable jacket 405 on opposite sides of the fiber subunit 410. In other embodiments, strength rods may be embedded at other positions within the jacket 405. Other example embodiments may include strength members incorporated into a cable core. For example, strength members may be positioned adjacent to the fiber subunit 410. Indeed, a wide variety of different cable constructions may incorporate one or more fiber subunits and one or more strength members at various positions. As described above with reference to the strength member 315 of FIG. 3, strength members, such as strength rods 425A, 425B, may be formed from a wide variety of suitable materials. Additionally, a strength member may have any desired diameter and/or other dimensions as desired in various embodiments.

The jacket 405 may be a single layer jacket or, alternatively, may have multiple layers. In certain embodiments, a first (or inner) jacket layer may be extruded or otherwise formed over the fiber subunit 410. A second (or outer) jacket layer may then be extruded or otherwise formed over the first jacket layer and the strength rods 425A, 425B. The second jacket layer may be designed to be at least partially stripped from the inner jacket layer, for example, using a suitable stripping tool. As a result, the outer jacket layer and the strength rods 425A, 425B can be selectively removed from the cable 400. When the outer jacket layer is maintained, the cable 400 may be more suitable for outdoor deployment. When the outer jacket layer is removed or stripped, the cable 400 may be more suitable for indoor deployment. Thus, the outer jacket layer may be selectively removed during installation of the cable and a portion of the cable may be deployed in an outdoor environment while another portion of the cable is deployed in an indoor environment. In other embodiments, a single jacket layer may be extruded over a combination of the fiber subunit 410 and the strength rods 425A, 425B.

In certain embodiments, one or more optical fibers 420A, 420B may be disposed within an optical fiber subunit 410. An optical fiber subunit 410 may include a sheath 415 formed or positioned around one or more internal components, such as the optical fibers 420A, 420B and, in certain embodiments, a ripcord 125. Any number of optical fibers may be situated within the fiber subunit 410, and the fibers 420A, 420B may extend lengthwise along the cable 400. In certain embodiments, the cable 400 may be formed as a simplex drop cable with a single optical fiber positioned in the fiber subunit 410. In another embodiment, the cable 400 may be formed as a duplex drop cable with two optical fibers positioned in the fiber subunit 410. Other numbers of optical fibers may be utilized in other embodiments. Indeed, in various embodiments, a fiber subunit 410 may include one, two, four, eight, twelve, or some other number of optical fibers.

With continued reference to the fiber subunit 410, the sheath 415 may be formed around the internal components (e.g., the optical fibers 420A, 420B, a rip cord, etc.) of the fiber subunit 410. In certain embodiments, the sheath 115 may be formed as a tube or shield around the internal components of the fiber subunit 410. As desired, the sheath 415 may separate the internal components of the fiber subunit 410 from the inner surface of the jacket 405. As desired in various embodiments, the sheath 415 may include any number of suitable layers (e.g., a single layer, multiple layers). For example, the sheath may be formed as a dual layer sheath. Additionally, each layer of the sheath 415 may be formed from a wide variety of suitable materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, ethylene, plastic, rubber, or other appropriate materials or combinations of suitable materials.

In one example embodiment, the sheath 415 may be formed from two polymer layers. For example, the sheath 415 may be formed as a dual layer acrylate tube. In certain embodiments, an outer layer of the sheath 415 may be harder than an inner layer of the sheath 415. In other words, the inner layer may have a lower durometer than the outer layer. In this regard, the inner layer may more easily conform to the shape of the internal components of the fiber optic subunit 410 while the outer layer exhibits greater compression resistance, and therefore, provides greater structural support, and therefore, increase protection. Additionally, in certain embodiments, one or more coatings or treatments may be applied to the sheath 415. For example, microparticles, microspheres, microbeads, or other suitable particulate matter (e.g., glass microbeads, polytetrafluoroethylene ("PTFE") microparticles, thermoplastic microparticles, etc.) may be embedded into or attached to an outer surface of the sheath 415. The microparticles may lower or reduce the coefficient of friction between the fiber subunit 410 and the cable jacket 405, thereby permitting the fiber subunit 410 to readily or more easily find its lowest stress state when forces are applied to the cable 400. As a result, stresses exhibited on the cable jacket 405 may be decoupled from the fiber subunit 410 and the optical fibers 420A, 420B disposed therein.

Additionally, in certain embodiments, the cable 400 may be formed as a "dry" cable. As a result, it may be easier for a technician to install the cable as the technician will not be required to wipe off a grease or gel when the internal contents of the fiber subunit 410 are accessed. In other embodiments, the fiber subunit 410 may be filled or partially filled with a suitable filling compound, such as a gelatinous, solid, powder, moisture absorbing material, water-swellable substance, dry filling compound, or foam material.

As desired in various embodiments, a wide variety of other materials may be incorporated into the cable 400. For example, the cable 400 may include an armor layer (e.g., a metal armor layer, a corrugated armor layer, etc.), water blocking material (e.g., water blocking yarns, water blocking fibers, water swellable materials, water blocking powders, water blocking gels, etc.), and/or a location element. An example location element may include a metallic wire (e.g., a copper wire) or strip embedded into or attached to the jacket 405 that permits the cable to be located, for example, when buried. Additionally, as desired, the cable 400 may include a wide variety of strength members, insulating materials, dielectric materials, flame retardants, flame suppressants or extinguishants, and/or other materials.

The cables 300, 400 illustrated in FIGS. 3 and 4 are provided by way of example only. Embodiments of the disclosure contemplate a wide variety of other cables and cable constructions. These other cables may include more or less components than the cables 300, 400 illustrated in FIGS. 3 and 4. Indeed, tight buffered optical fibers having strippable buffer layers may be incorporated into a wide variety of different types of cables.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tight buffered optical fiber comprising:
   an optical fiber comprising a core, a cladding, and at least one protective coating layer; and
   a tight buffer layer formed on and directly around the optical fiber, the tight buffer layer comprising a thermoplastic polymer blended with a siloxane slip agent that facilitates stripping the tight buffer layer from the optical fiber with a strip force of approximately 20 N or less per 25 mm of tight buffer layer.

2. The tight buffered optical fiber of claim 1, wherein the siloxane slip agent facilitates stripping approximately 100 mm of the tight buffer layer from the optical fiber with a strip force of approximately 15 N or less.

3. The tight buffered optical fiber of claim 1, wherein the siloxane slip agent has a molecular weight of at least approximately 600,000.

4. The tight buffered optical fiber of claim 1, wherein the siloxane slip agent is incorporated into a pelletized material that is blended with the thermoplastic polymer prior to extrusion of the buffer layer.

5. The tight buffered optical fiber of claim 4, wherein the pelletized material further comprises ethylene vinyl acetate.

6. The tight buffered optical fiber of claim 1, wherein the thermoplastic polymer comprises polyvinyl chloride.

7. The tight buffered optical fiber of claim 1, wherein the siloxane slip agent is compounded with the thermoplastic polymer at a mix rate of between approximately 0.01% and approximately 5.0% by volume.

8. The tight buffered optical fiber of claim 1, wherein the buffer layer is formed to have an outer diameter of approximately 900 micrometers.

9. A cable comprising the tight buffered optical fiber of claim 1.

10. A cable comprising:
    an outer jacket defining a cable core;
    an optical fiber positioned within the cable core, the optical fiber comprising a core, a cladding, and at least one protective layer formed around the cladding; and
    a tight buffer layer formed directly on and surrounding the optical fiber along a longitudinal direction of the cable, the tight buffer layer comprising:
    a thermoplastic polymer; and
    a siloxane slip agent mixed with the thermoplastic polymer to facilitate separation of the tight buffer layer from the optical fiber with a strip force of approximately 20 N or less per 25 mm of tight buffer layer.

11. The cable of claim 10, wherein the siloxane slip agent facilitates stripping at least approximately 100 millimeters of the tight buffer layer from the optical fiber with a strip force of approximately 15 N or less.

12. The cable of claim 10, wherein the siloxane slip agent is blended with the thermoplastic polymer prior to extrusion of the tight buffer layer.

13. The cable of claim 10, wherein the siloxane slip agent is dispersed in ethylene vinyl acetate prior to mixing with the thermoplastic polymer.

14. The cable of claim 10, wherein the thermoplastic polymer comprises polyvinyl chloride.

15. The cable of claim 10, wherein the siloxane slip agent is mixed with the thermoplastic polymer at a mix rate of between approximately 0.1% and approximately 5.0% by volume.

16. The cable of claim 10, wherein the tight buffer layer is extruded onto the optical fiber.

17. The cable of claim 10, wherein the tight buffer layer is formed to have an outer diameter of approximately 900 micrometers.

18. A cable comprising:
    an outer jacket defining a cable core;
    at least one tight buffered optical fiber positioned within the cable core and extending along a longitudinal direction, each tight buffered optical fiber comprising:
    an optical fiber comprising a core and a cladding;
    at least one protective layer surrounding the optical fiber; and
    a tight buffer layer in direct contact with and surrounding the at least one protective layer, the tight buffer layer comprising a thermoplastic polymer blended with a siloxane slip agent having a molecular weight of at least approximately 600,000 that facilitates stripping the tight buffer layer from the at least one protective layer with a strip force of approximately 20 N or less per 25 mm of tight buffer layer.

19. The cable of claim 18, wherein the siloxane slip agent facilitates stripping approximately 100 mm of the tight buffer layer from the at least one protective layer with a strip force of approximately 15 N or less.

20. The cable of claim 18, wherein the siloxane slip agent is blended with the thermoplastic polymer at a mix rate of between approximately 0.1% and approximately 5.0% by volume.

* * * * *